United States Patent [19]

Lakshmanan

[11] 4,167,433

[45] Sep. 11, 1979

[54] ADHESIVE COMPOSITION AND PROCESS FOR BONDING

[75] Inventor: Pallavoor R. Lakshmanan, Houston, Tex.

[73] Assignee: Gulf Oil Corporation, Pittsburgh, Pa.

[21] Appl. No.: 848,286

[22] Filed: Nov. 3, 1977

[51] Int. Cl.$^2$ ............................................. C08L 93/00
[52] U.S. Cl. ................................... 156/322; 156/334; 260/27 EV; 260/25; 260/28.5 AV
[58] Field of Search ............... 260/27 EV, 25, 897 B; 156/322, 334

[56] References Cited

U.S. PATENT DOCUMENTS

| | | | |
|---|---|---|---|
| 3,175,986 | 3/1965 | Apikos et al. | 260/27 EV X |
| 3,448,178 | 6/1969 | Flanagan | 260/897 B |
| 3,615,106 | 10/1971 | Flanagan et al. | 260/27 EV X |
| 3,654,207 | 4/1972 | Arabian et al. | 260/897 B X |
| 3,704,157 | 11/1972 | McDonald | 260/897 B X |
| 3,734,798 | 5/1973 | Dooley | 260/897 B X |
| 3,896,069 | 7/1975 | Kosaka et al. | 260/897 B X |
| 4,061,519 | 12/1977 | Hammer | 156/322 X |

FOREIGN PATENT DOCUMENTS 83829 12/1971 German Democratic Rep. ..... 156/322

Primary Examiner—Lewis T. Jacobs

[57] ABSTRACT

An adhesive composition effective in bonding low-energy plastic surfaces to each other which provides improved low temperature performance containing the following components: (1) a first ethylene-vinyl ester copolymer haing from about 4 to about 35 weight percent of a vinyl ester; (2) a second ethylene-vinyl ester copolymer having an excess of 35 weight percent of a vinyl ester; (3) a tackifier selected from the following group (a) a rosin, (b) a rosin ester, (c) a terpene resin, (d) a terpene-phenolic resin and (e) a rosin-modified phenolic resin; and (4) a polyethylene wax having a molecular weight of about 600 to about 3000 and a process for bonding low-energy plastic surfaces to each other.

27 Claims, No Drawings

ADHESIVE COMPOSITION AND PROCESS FOR BONDING

BACKGROUND OF THE INVENTION

1. Field of the Invention

The present invention is useful bonding low-energy plastic surfaces to each other, for example, in construction, automotive applications, plastic fabricating, packaging, structural foam bonding, etc. The adhesive composition described herein is effective in bonding low-energy plastic surfaces to each other which provides an improved low temperature performance containing the following components: (1) a first ethylene-vinyl ester copolymer having from about 4 to about 35 weight percent of a vinyl ester; (2) a second ethylene-vinyl ester copolymer having an excess of 35 weight percent of a vinyl ester; (3) a tackifier selected from the following group (a) a rosin (b) a rosin ester, (c) a terpene resin, (d) a terpene-phenolic resin and (e) a rosin-modified phenolic resin, and (4) a polyethylene wax having a molecular weight of about 600 to about 3000 and a process for bonding low-energy plastic surfaces to each other.

2. Description of the Prior Art

Ordinarily, adhesive bonding of low-energy plastic surfaces to each other requires some form of surface treatment prior to application of an adhesive to obtain high bond strengths between the surfaces so contacted. Low-energy plastic surfaces bonded to each other without prior surface treatment, such as by relatively weak, tacky adhesives, are inadequate for many purposes such as those requiring strengths in a range in excess of several hundreds or thousands of pounds per square inch gauge of bonded area.

For strong bonds involving low-energy plastic surfaces, some form of surface treatment or etching is required prior to application of an adhesive. Surface pretreatment of low-energy plastic surfaces, for example, involves either acid etching with sulfuric, nitric, chromic acids or mixtures thereof, or flame treatment, corona discharge treatment, treatment with plasma jets or low and high energy radiation.

Adhesive compositions which may be used for bonding low-energy plastic surfaces, but requiring surface treatment, include polysulfide-rubber modified epoxies, epoxy-polyamides, nitrile-phenolics and polyesters. These compositions, may additionally, require long hours of post-cure and/or clamping at temperatures substantially higher than room temperature. Often at least two of the components of these adhesive compositions must be premixed prior to application.

Consequently, a need exists for an adhesive composition and much simpler process for bonding low-energy plastic surfaces to each other for low temperature performance. In accordance with the present invention a novel hot melt adhesive composition is provided which requires minimal heating of the surfaces to be bonded together and maximum bond strength is obtained in a matter of minutes or a few hours without resort to elaborate post-curing procedures. Further, the adhesive composition of the present invention can be applied in its melt form to low-energy plastic surfaces in such a manner to provide rapid assembly of components and immediate handling of the assembled parts. Another advantage of the present invention is that the bonds can deliver improved tensile lap shear strengths at low temperature.

Applicant is unaware of any prior art relevant to the invention defined and claimed herein.

SUMMARY OF THE INVENTION

I have discovered a unique adhesive composition effective in bonding low-energy plastic surfaces to each other which provides improved low temperature performance which comprises: (1) a first ethylene-vinyl ester copolymer having from about 4 to about 35 weight percent of a vinyl ester; (2) a second ethylenevinyl ester copolymer having an excess of 35 weight percent of a vinyl ester; (3) a tackifier selected from the group consisting of (a) a rosin, (b) a rosin ester, (c) a terpene resin, (d) a terpene-phenolic resin and (e) a rosin-modified phenolic resin; and (4) a polyethylene wax having a molecular weight of about 600 to about 3000.

Further I have discovered a process for bonding low-energy plastic surfaces having a critical surface tension of about 24 to about 37 dynes per centimeter to each other which comprises: (A) heating said surfaces that will be bonded to each other to a temperature of at least about 50° C., (B) applying an adhesive composition effective in bonding low-energy plastic surfaces to each other which provides improved low temperature performance, said adhesive composition comprising (1) a first ethylene-vinyl ester copolymer having from about 4 to about 35 weight percent of a vinyl ester; (2) a second ethylene-vinyl ester copolymer having an excess of 35 weight percent of a vinyl ester; (3) a tackifier selected from the group consisting of (a) a rosin, (b) a rosin ester, (c) a terpene resin, (d) a terpene-phenolic resin and (e) a rosin-modified phenolic resin; and (4) a polyethylene wax having a molecular weight of about 600 to about 3000, to at least one of said surfaces and wherein said adhesive composition is in a temperature range of about 140 to about 240° C. at the time of application and then (C) bringing said surfaces in contact with each other.

DESCRIPTION OF THE INVENTION

The adhesive composition of the present invention contains two specific ethylene-vinyl ester copolymers, having varying vinyl acetate contents, a tackifier, and a specific polyethylene wax.

First Ethylene-Vinyl Ester Copolymer

Ethylene-vinyl ester copolymers that can be used herein include vinyl esters having from 2 to 4 carbon atoms. Examples of suitable ethylene-vinyl ester copolymers are ethylene-vinyl acetate, ethylene-vinyl formate, ethylene-vinyl propionate, ethylene-vinyl butyrate and mixtures thereof. The first copolymer can contain from about 4 to about 35 weight percent, preferably about 6 to about 28 weight percent, of a vinyl ester, and can have a melt index as measured by ASTM 1238-52T of about 0.5 to about 200, preferably 2.0 to about 100. These copolymers can be prepared by any method generally employed in the art, for example, preparation such as that taught in U.S. Pat. Nos. 2,200,429 to Perrin et al. and 2,703,794 to Roedel. In the present invention blends, or mixtures, of ethylene-vinyl ester copolymers are sometimes used to obtain a melt index within the desired range. For example, if blends or mixtures of ethylene-vinyl ester copolymers are employed, individual ethylene-vinyl ester copolymers can be used even if they do not have the melt index defined above, provided the resulting mixture has a melt index within the defined range.

Second Ethylene-Vinyl Ester Copolymer

Ethylene-vinyl ester copolymers that can be used in this portion of the invention herein include vinyl esters having from 2 to 4 carbon atoms. Examples of suitable ethylene-vinyl ester copolymers are ethylene-vinyl acetate, ethylene-vinyl formate, ethylene-vinyl propionate, ethylene-vinyl butyrate and mixtures thereof. The second copolymer can contain in excess of 35 weight percent of a vinyl ester, preferably about 36 to about 48, and most preferably about 38 to about 45 weight percent of a vinyl ester. A preferred copolymer used in the experiments herein contained 40 weight percent of a vinyl ester. Ethylene-vinyl copolymers employed in this portion of the invention can have a melt index as measured by ASTM 1238-52T of about 0.5 to about 200, preferably 2.0 to about 100. These copolymers can be prepared by any method generally employed in the art, for example, preparation such as that taught in U.S. Pat. Nos. 2,200,429 to Perrin et al. and 2,703,794 to Roedel.

Tackifiers

As contemplated in the present invention suitable tackifiers can be selected from the group consisting of (a) a rosin, (b) a rosin ester, (c) a terpene resin, (d) a terpene-phenolic resin and (e) a rosin-modified phenolic resin. Tackifiers which are present in the adhesive composition serve to extend the adhesive properties of the ethylene-vinyl ester copolymers. Tackifiers for use in the present invention have a softening point in the range of about 40 to about 150° C., preferably about 65 to about 135° C. Small amounts of tackifiers having a softening point of less than 40° C., or higher than 150° C. can be mixed or blended with tackifiers in the desired range to give desirable results; however, tackifier blends having a tackifier with a softening point of less than 40° C. or higher than 150° C. are not preferred in the invention as set forth. Examples of rosins and rosin esters in the hot melt system include both natural and modified rosins, such as for example, gum rosin, wood rosin, tall oil rosin, distilled rosin, hydrogenated rosin, dimerized rosin, disproportionated rosin and polymerized rosin; glycerine and pentaerythritol esters of rosin, including stablized, hydrogenated, polymerized, disproportionated, dimerized and unmodified rosin. Terpene resins, sometimes called polyterpene resins, result from polymerization of terpene hydrocarbons, such as bicyclic monoterpene known as pinene, in the presence of a Friedel-Crafts catalyst at moderately low temperatures. Terpene resins effective for the adhesive composition have a softening point as measured by ASTM E28-58T of from about 40 to about 135° C. Another example of a suitable terpene resin is a polymerized beta-pinene. Terpene-phenolic resins can include, for example, the product resulting from the condensation of bicyclic terpene, in an acidic medium and/or terpene alcohol with phenol. Rosinmodified phenolic resins can include, for example, the reaction products of rosin with phenol-formaldehyde condensate. Rosin and rosin esters can be prepared, for example, according to the methods described in *Encyclopedia of Polymer Science and Technology*, Interscience Publishers, a Division of John Wiley & Sons (New York: 1964), Volume 12, pp. 139-164; terpene resins can be prepared, for example, according to the methods described in Volume 13, pp. 575-596 of the same publication. Terpene phenolic-resins and rosin-modified phenolic resins can be prepared, for example, according to the methods described in *Organic Coating Technology*, H. F. Payne, John Wiley & Sons (New York: 1954), Volume 1, pp. 183-184 and 168-170, respectively,

Polyethylene Wax

A polyethylene wax is employed to reduce the melt viscosity of the hot melt adhesive composition without appreciably decreasing the adhesive bonding. Suitable polyethylene waxes in the present invention have an average molecular weight of about 600 to about 3000, preferably about 600 to about 2500, and most preferably about 900 to about 2000. Polyethylene waxes useful in the present invention are essentially linear, that is, at least 70 percent of the molecules are linear or paraffinic; preferably at least 90 percent are linear. The n-paraffin or n-alkane content of hydrocarbon waxes can be determined by molecular sieve adsorption or by urea adduction. The penetration or hardness of the wax at 25° C. is about 0.25 to about 1.5, preferably about 0.75 to about 1.00 as determined by ASTM-D 1321. The density at 25° C. of the polyethylene wax employed in the present invention is about 0.93 to about 0.97, preferably about 0.94 to about 0.96. Each of the enumerated parameters are interrelated as is readily apparent to one of ordinary skill in the art. Polyethylene waxes can be obtained, for example, by the low pressure polymerization of ethylene using Ziegler catalysts.

If desired, other components generally added to an adhesive composition for a particular purpose can also be present in an amount of about 0.1 to about 5, preferably about 0.2 to about 2, weight percent based on the weight of the final composition. An example of such an additive is an antioxidant such as butylated hydroxy toluene.

For purpose of the present invention a low-energy surface is defined as one which has a critical surface tension (yc) of between about 24 to about 37 dynes/cm (mN/m). For example, polyethylene ranges from about 25.5 to about 36 dynes/cm, and polypropylene ranges from about 24 to about 34 dynes/cm.

In general, the adhesive composition defined and claimed herein can have the following components in the following amounts as set forth in Table 1.

Table 1

| Adhesive Composition | | |
|---|---|---|
| | Broad Range, wt % | Preferred Range, wt % |
| First Ethylene-Vinyl Ester Copolymer | 10 to 40 | 20 to 40 |
| Second Ethylene-Vinyl Ester Copolymer | 5 to 15 | 5 to 15 |
| Tackifier | 25 to 45 | 25 to 40 |
| Polyethylene Wax | 5 to 55 | 5 to 50 |

The adhesive composition can be prepared in any conventional manner. Thus, for example, a preferred procedure involves the use of a so-called melt mixing technique in which the wax (diluent), together with an antioxidant, if used, is maintained in a stirred molten state at a temperature between about 130 to about 230° C., preferably between about 140 to about 170° C., during which time the tackifier is added, followed by the addition of the ethylene-vinyl ester copolymers. Mixing is continued until a homogeneous mixture is obtained, approximately after about 15 minutes to about 4 hours.

The adhesive composition of the present invention is used to bond low-energy surfaces having a critical surface tension of about 24 to about 37 dynes per centimeter to each other. The process involves heating said surfaces which are to be bonded to each other to a temperature of at least about 50° C., preferably about 60 to about 130° C., followed by an application of the adhesive composition of the present invention, while the adhesive is in a temperature range of about 140 to about 240° C., preferably about 160 to about 220° C. to least one of the surfaces. Then said surfaces are brought in contact with each other. After assembly the bond reaches maximum tensile strength in a matter of minutes or few hours. No post-curing is required and therefore, a rapid assembly and handling of assembled parts is possible.

By low temperature as used herein is meant temperatures of about 10° C. and lower, that is, temperatures ranging from about 10 to about −30° C., preferably from about 0 to about −25° C., most preferably from about 0 to about −20° C.

DESCRIPTION OF PREFERRED EMBODIMENTS

The invention will be further described with reference to the experimental data.

The adhesive compositions in the present invention were prepared as follows: A polyethylene wax, in an amount sufficient to make a 201-gram batch of adhesive, was mixed with an antioxidant, butylated hydroxy toluene. The wax-antioxidant mixture was placed in a jacketed 400-ml capacity Brabender Plasticorder and kept hot by an oil bath heated to approximately 145 to about 155° C. At a slow, 50-rpm blade setting, the wax-antioxidant mixture was melted and then the tackifier was added while mixing continued. Continued mixing produced a fluid wax-antioxidant-tackifier mixture. Ethylene-vinyl ester copolymers were added to the fluid wax-antioxidant-tackifier mixture in the order of high melt index copolymer followed by low melt index copolymer. Mixing was continued at a top speed setting of the blades at approximately 150 rpm for approximately 10 to about 15 minutes until homogeneity occurred, and then the speed was decreased to 100 rpm and the composition was mixed for approximately 5 minutes. On completion of mixing, the torque generally leveled-off and the adhesive composition was ready to be poured. Total mixing time was about 15 to about 20 minutes.

Low energy-plastic test specimens were prepared in accordance with the following procedure. Test strips having a dimensions of 1×3×⅛ in. (2.54×7.5×0.31 cm) or 1×3×3/16 in. (2.54×7.5×0.47 cm) were used in the preparation of tensile lap shear strength test specimens. The strips were cleaned with acetone rinse and wiped dry. The test strips (two for each test specimen) were then exposed to an infrared lamp to heat the surface areas to be bonded to between about 90 to about 95° C. Molten adhesive at temperatures between about 176 to about 190° C. was applied as a ⅛ in. (0.31 cm) bead over a square inch (6.45 cm$^2$) area on one of the test strips. A lap shear strength specimen was prepared immediately following application of the adhesive composition by quickly placing another strip over the adhesive with the heated side of the strip of the adhesive to provide a square inch (6.45 cm$^2$) lap. Manual pressure was used to spread the adhesive over the bonded area. A 500-gram weight was then placed on the bonded area and left for about 5 minutes, to maintain contact of the surfaces during initial cooling, after which it was removed. The specimen was cooled to 23° C. and excess adhesive was removed. The specimen was stored overnight prior to testing. At least two specimens were prepared for each evaluation and the values reported as an average of the two for a given test run.

The method used for testing the adhesive bond strength was the tensile lap shear method with modifications as described in U.S. Pat. No. 3,393,175 at columns 2 through 3. The values for lap shear were measured by determining on an Instron the force required to break the bond. As a modification employed herein, the rate of extension was 2 inches (5 cm) per minute. The force divided by the area of the bond gives the lap shear in pounds per square inch.

Several runs were carried out using the adhesive compositions set forth in the upper portion of Table 2 to demonstrate improved tensile lap shear strength at low temperatures. It can be seen that the addition of a second ethylene-vinyl ester copolymer having an excess of 35 weight percent of a vinyl ester in Run No. 2 resulted in an improved tensile lap shear strength at low temperatures. In fact, note that the tensile lap shear strength greatly increased up to a temperature of −10° C. Although the tensile lap shear strength decreased at a temperature of −30° C., it was still higher than the same adhesive but without the second ethylene-vinyl acetate copolymer.

| Low Temperature Performance of Adhesive Composition | | | | |
|---|---|---|---|---|
| Run No. | 1 | 2 | 3 | 4 |
| Composition, parts by weight[1] | | | | |
| Ethylene-Vinyl Acetate Copolymer (18 wt % vinyl acetate; melt index 500)[2] | 10 | 9 | 9 | 9 |
| Ethylene-Vinyl Acetate Copolymer (18 wt % vinyl acetate; melt index 2.5)[3] | 30 | 27 | 27 | 27 |
| Ethylene-Vinyl Acetate Copolymer (40 wt % vinyl acetate; melt index 57)[4] | — | 10 | — | — |
| Ethylene-Vinyl Acetate Copolymer (51 wt % vinyl acetate; melt index 21) | — | — | 10 | — |
| Ethylene-Vinyl Acetate Copolymer (60 wt % vinyl acetate; melt index 7.5) | — | — | — | 10 |
| Glycerine Ester of Highly Hydrogenated Rosin, softening point 83° C. | 40 | 36 | 36 | 36 |
| Polyethylene Wax[5] | 20 | 18 | 18 | 18 |
| Inspections | | | | |
| Viscosity, cps at 350° F. (176.6° C.) | 19,000 | 66,500 | 30,600 | 30,000 |
| Tensile Lap Shear, psi. (kg/cm$^2$) one-half square inch lap (1.6 cm$^2$) | | | | |
| At room temperature (25° C.) | 1080 (75.9) | 1014 (71.29) | 755 (53.09) | 757 (53.27) |

-continued

| Low Temperature Performance of Adhesive Composition | | | | |
|---|---|---|---|---|
| Run No. | 1 | 2 | 3 | 4 |
| 0° C. | 894 (62.85) | 1404 (98.71) | 365 (25.66) | 327 (23.0) |
| −10° C. | 630 (44.29) | 1801 (126.62) | 325 (22.85) | 299 (21.0) |
| −30° C. | 637 (44.78) | 718 (50.48) | — | — |

[1]Optional antioxidant, for example, 0.5 parts by weight butylated hydroxy toluene was used in all experiments herein.
[2]Elvax 410 purchased from E. I. DuPont.
[3]Elvax 460 purchased from E. I. DuPont.
[4]Elvax 40 purchased from E. I. DuPont.
[5]Penetration 1 as determined by ASTM-D 1321 at 25° C., density 0.96 g/cc at 25° C.; molecular weight 1600.

Obviously, many modifications and variations of the invention, as hereinabove set forth, can be made without departing from the spirit andd scope thereof, and therefore only such limitations should be imposed as are indicated in the appended claims.

What is claimed is:

1. An adhesive composition effective in bonding low-energy plastic surfaces to each other which provides low temperature performance consisting essentially of: (1) a first ethylene-vinyl ester copolymer having from about 4 to 35 weight percent of a vinyl ester; (2) a second ethylene-vinyl ester copolymer having about 36 to about 48 weight percent of a vinyl ester; (3) a tackifier selected from the group consisting of (a) a rosin, (b) a rosin ester, (c) a terpene resin, (d) a terpenephenolic resin and (e) a rosin-modified phenolic resin and (4) a polyethylene wax having a molecular weight of about 600 to about 3000, a penetration as measured by ASTM-D 1321 of about 0.25 to about 1.5 at 25° C., and a density at 25° C. of about 0.93 to about 0.97.

2. An adhesive composition according to claim 1 wherein said first and second ethylene-vinyl ester copolymers are selected from the group consisting of ethylene-vinyl acetate, ethylene-vinyl formate, ethylene-vinyl propionate, ethylene-vinyl butyrate, and mixtures thereof.

3. An adhesive composition according to claim 1 wherein said first copolymer contains from about 6 to about 28 weight percent of a vinyl ester.

4. An adhesive composition according to claim 1 wherein said first and second copolymers have a melt index of about 0.5 to about 200 as measured by ASTM 1238-52T.

5. An adhesive composition according to claim 1 wherein said first and second copolymers have a melt index of about 2.0 to about 100.

6. An adhesive composition according to claim 1 wherein said second ethylene-vinyl ester copolymer contains from about 38 to about 45 weight percent of a vinyl ester.

7. An adhesive composition according to claim 1 wherein said second copolymer contains about 40 weight percent of a vinyl ester.

8. An adhesive composition according to claim 1 wherein said tackifier has a softening point of about 40 to about 150° C.

9. An adhesive composition according to claim 1 wherein said tackifier has a softening point of about 65 to about 135° C.

10. An adhesive composition according to claim 1 wherein said rosin is selected from the group consisting of gum rosin, wood rosin, tall oil rosin, distilled rosin, hydrogenated rosin, dimerized rosin, and polymerized rosin.

11. An adhesive composition according to claim 1 wherein said rosin ester is selected from the group consisting of glycerine and pentaerythritol esters of stabilized, hydrogenated, polymerized, disproportionated, dimerized and unmodified rosin.

12. An adhesive composition according to claim 1 wherein said terpene resin is selected from the group consisting of polyterpene and polymerized beta-pinene resins.

13. An adhesive composition according to claim 1 wherein said terpene-phenolic resin is the condensation product of phenol with terpene alcohol or alpha-terpinene.

14. An adhesive composition according to claim 1 wherein said tackifier is a rosin-modified phenolic resin.

15. An adhesive composition according to claim 1 wherein said polyethylene wax has a molecular weight of about 600 to about 2500.

16. An adhesive composition according to claim 1 wherein said polyethylene wax has a molecular weight of about 900 to about 2000.

17. An adhesive composition according to claim 1 wherein said polyethylene wax is composed of at least 70 percent linear molecules.

18. An adhesive composition according to claim 1 wherein said polyethylene wax is composed of at least 90 percent linear molecules.

19. An adhesive composition according to claim 1 wherein said polyethylene wax has a penetration of about 0.75 to about 1.00 at 25° C.

20. An adhesive composition according to claim 1 wherein said polyethylene wax has a density of about 0.94 to about 0.96.

21. An adhesive composition according to claim 1 wherein said first ethylene-vinyl ester copolymer is about 10 to about 40 weight percent; said second copolymer is about 5 to about 15 weight percent; said tackifier is about 25 to about 45 weight percent; and said polyethylene wax is about 5 to about 55 weight percent of the total composition.

22. An adhesive composition according to claim 1 wherein said first ethylene-vinyl ester copolymer is about 20 to about 40 weight percent; said second copolymer is about 5 to 15 weight percent; said tackifier is about 25 to about 40 weight percent; and said polyethylene wax is about 5 to about 50 weight percent of the total composition.

23. A process for bonding low-energy plastic surfaces having a critical surface tension of about 24 to about 37 dynes per centimeter to each other which comprises; (A) heating said surfaces that will be bonded to each other to a temperature of at least about 50° C., (B) applying an adhesive composition effective in bonding low-energy plastic surfaces to each other which provides improved low temperature performance, said adhesive composition consisting essentially of: (1) a first ethylene-vinyl ester copolymer having from about 4 to 35 weight percent of a vinyl ester; (2) a second ethylene-vinyl ester copolymer having an excess of 35 weight percent of a vinyl ester; (3) a tackifier selected from the group consisting of (a) a rosin, (b) a rosin ester, (c) a terpene resin, (d) a terpene phenolic-resin and (e) a rosin-modified phenolic resin; and (4) a polyethylene wax having a molecular weight of about 600 to about 3000, a penetration as measured by ASTM-D 1321 of about 0.25 to about 1.5 at 25° C., and a density at 25° C. of about 0.93 to about 0.97, to at least one of said surfaces and wherein said adhesive composition is in a temperature range of about 140 to about 240° C. at the time of application and (C) then bringing said surfaces in contact with each other.

24. A process according to claim 23 wherein said heating of said surfaces that will be bonded to each other is to a temperature of about 60 to about 130° C.

25. A process according to claim 23 wherein said low-energy plastic surface is polyethylene.

26. A process according to claim 23 wherein said low-energy plastic surface is polypropylene.

27. A process according to claim 23 wherein said adhesive composition is in a temperature range of about 160 to about 220° C. at the time of application.

* * * * *